United States Patent [19]
Oickle

[11] 3,820,449
[45] June 28, 1974

[54] EJECTION MEANS FOR APPARATUS FOR PROCESSING FOOD STUFF

[75] Inventor: Dawson Eugene Oickle, Block House, Nova Scotia, Canada

[73] Assignee: National Sea Products Limited, Halifax, Nova Scotia

[22] Filed: July 25, 1972

[21] Appl. No.: 274,966

[30] Foreign Application Priority Data
Sept. 14, 1971  Canada................................ 122788

[52] U.S. Cl.................... 99/485, 100/218, 425/444
[51] Int. Cl............................................. B30b 15/32
[58] Field of Search........ 17/32; 425/351, 350, 422, 425/444; 62/341; 99/485, 489, 646 R, 195, 194; 100/38, 93 P, DIG. 10, 218, 215, 180, 179, 177, 154

[56] References Cited
UNITED STATES PATENTS
| | | | |
|---|---|---|---|
| 2,542,133 | 2/1951 | Gorby................................... | 99/485 |
| 3,433,647 | 3/1969 | Johnston............................... | 17/32 |
| 3,728,136 | 4/1973 | Langlands....................... | 100/218 X |
| 3,756,231 | 9/1973 | Ross............................ | 100/DIG. 10 |

FOREIGN PATENTS OR APPLICATIONS
706,027   5/1966   Italy.................................... 100/215

*Primary Examiner*—Leon G. Machlin
*Attorney, Agent, or Firm*—Cushman, Darby & Cushman

[57] ABSTRACT

A shaped food product, particularly fish is made by forming individual portions of the flesh, each being of predetermined size and being in a frozen condition, into a predetermined shape by forcing the flesh portions individually into a forming die cavity adapted to impart the predetermined shape to each portion. Ejecting means including a web which is drawn across the mouth of the die cavity to positively eject the formed flesh therefrom when the die is retracted are provided.

6 Claims, 9 Drawing Figures

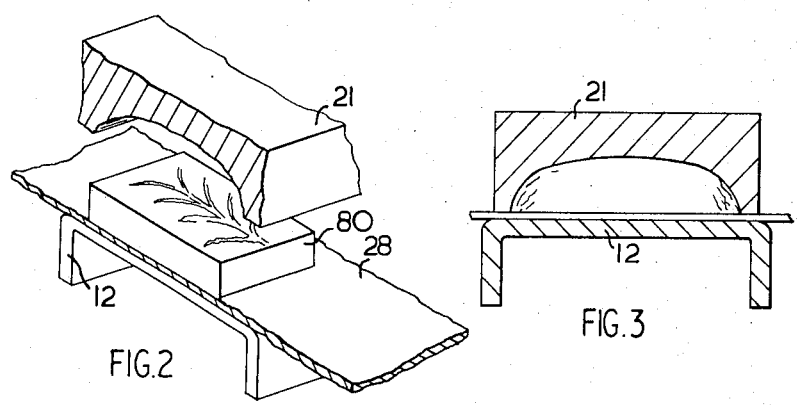
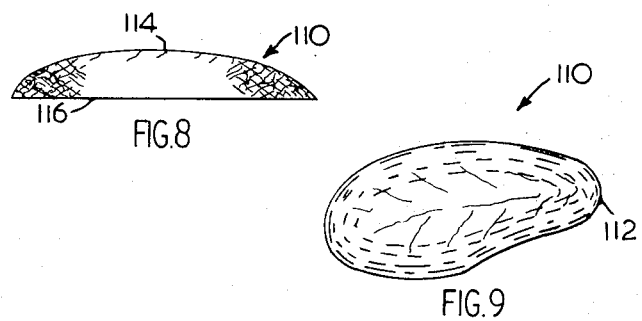

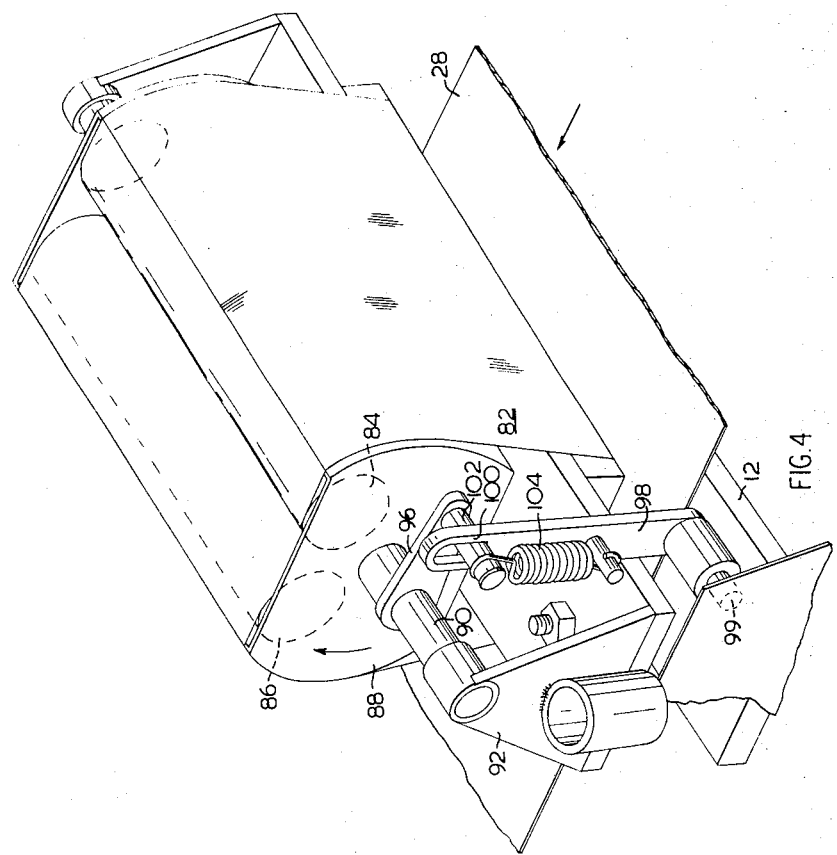

EJECTION MEANS FOR APPARATUS FOR PROCESSING FOOD STUFF

BACKGROUND OF THE INVENTION

This invention relates to improvements in apparatus particularly suitable for producing a shaped edible flesh food product.

In order to successfully market a product it is important that the product be prepared and processed in such a way that it has an attractive appearance insofar as the customer is concerned. No where is this more true than in the food processing industry. Since most foods are sold today in self-service supermarkets it is more important than ever that the food stuff, whatever its nature, be presented so as to have as much "eye appeal" to the customer as possible.

Our Canadian Pat. No. 895,227 issued Mar. 14, 1972 relates generally to the forming and shaping of an edible flesh food product to provide an attractive, marketable product. While this patent has particular reference to the manufacture of fish products, it was contemplated that other types of meat, e.g., beef, pork or mutton, could be processed in accordance with the inventive principles set forth therein.

The above mentioned Canadian Pat. No. 895,227 describes and claims a method of making a shaped edible flesh food product which includes the step of forming individual portions of the flesh, each being of predetermined size and being at least in a frozen condition, into a predetermined shape. In the preferred form of that invention each flesh portion is formed by forcing the latter individually into a forming die cavity adapted to impart the predetermined shape to each portion. Advantageously, the volume of each portion of predetermined size prior to the forming step, equals the volume of the formed food portion.

The above referred to Canadian Pat. No. 895,227 also claims a frozen shaped edible flesh food product which has an attractive shape and marginal outline when seen in plan view. In order to enhance the eye appeal of the product, the latter is shaped such that it has the appearance of a natural fish fillet.

The above mentioned Canadian Pat. No. 895,227 also describes apparatus suitable for forming the abovementioned shaped edible flesh product, which apparatus includes a forming station having a forming die all arranged to engage and form portions of flesh fed thereto. A device for feeding individual portions of the flesh to the forming station is provided together with mechanism for effecting actuation of the feeding device and the forming die in timed relation to one another to effect forming of the flesh portions. In the preferred form of the apparatus the forming station includes a fixed platen with the feeding device being arranged to feed each flesh portion to a position intermediate the forming die and the platen when the die is in a retracted position. When the forming die is advanced the flesh portions are engaged in pressurized relation between the die and the platen. The feeding device mentioned above preferably includes an endless conveyor belt defining a path of travel which extends over the fixed platen. The means for effecting actuation of the feeding means includes a mechanism for driving the conveyor belt in step-by-step fashion to bring successive flesh portions intermediate the forming die and the fixed platen to permit them to be formed in sequential fashion. Ejecting means are associated with the die for positively ejecting the formed flesh therefrom when the die is retracted. A web of synthetic plastics material is arranged such that it is interposed between the interior or cavity of the die and the flesh portion during the forming step with means being provided to move the web relative to the die cavity to effect ejection. A suggestion was made that the web could be shifted forwardly slightly across the mouth of the die to effect ejection of the formed food portion.

SUMMARY OF THE INVENTION

The present invention relates generally to apparatus of the character set forth in the above mentioned Canadian patent and specifically to apparatus for effecting ejection of the formed flesh portions from the die cavities. In particular, the apparatus provides means for supporting a web of material such that it is disposed between the food portion and the die cavity during the forming operation and shifting the web across the mouth of the die cavity after the end of each forming step to effect ejection of the formed food product.

In the preferred embodiment, the web of material is carried on supply and take off rolls which, in turn, are carried by a carrier drum mounted for rocking movement relative to the forming die. Linkage extending from a fixed point on the apparatus to the carrier drum causes the latter to rock as the forming die moves away from an other die member thus causing the web, which extends over the forming die cavity between the supply and take off rolls, to be shifted across the die cavity thus effecting ejection. A lost motion connection permits the forming die to move away from pressurized engagement with the web and the food portion before movement of the web is forced to take place. This feature obviates over-stressing and possibly rupturing the web.

BRIEF DESCRIPTION OF THE DRAWINGS

The other features of the invention together with a fuller understanding thereof will be had from a reading of the following description of preferred embodiments of the invention read in conjunction with the drawings in which:

FIGS. 2 and 3 are additional views illustrating the formation of a piece of edible flesh;

FIG. 4 is a perspective view of one form of ejecting means according to the present invention which is provided in the apparatus of FIG. 1;

FIGS. 8 and 9 are a plan and elevation views respectively of the shaped frozen flesh product.

DESCRIPTION OF THE PREFERRED EMBODIMENT

Before describing the preferred form of apparatus for carrying out the process, the process will be described in general terms utilizing fish as the foodstuff. As mentioned previously the described process is the subject of our Canadian Pat. No. 895,227 issued Mar. 14, 1972.

The fresh fish is first frozen under pressure by any suitable prior art method and is then usually stored for any desired period of time. While still frozen, the fish is cut into regular shapes, the size of the portions being determined according to the weight desired. Generally speaking, each portion comprises a generally rectangular shape having length and width dimensions several times greater than the thickness dimension. The fish portions are then "tempered" that is, their temperatures are allowed to increase somewhat thereby to reduce the amount of pressure required to effect shaping of the frozen portions. Broadly speaking, the fish portions will be "tempered" until they have temperatures somewhere between about 10°F and the upper limit of the freezing range for fish which is about 28.5°F. If the tempering temperature is too low, excessive damage to the flesh of the fish occurs during the forming step and the flavour of the final cooked product will be impaired. If the tempering temperature is too high, the portions will thaw out during the forming stage and may lose the shape imparted thereto and require refreezing. At least reasonably good results can be achieved when the fish portions are "tempered" anywhere in the range from about 10°F to roughly 25°F; better results can be obtained if the tempering range is narrowed down to temperatures from about 15°F to about 25°F, with optimum results being achieved about the middle of this range, that is, when the fish portions are at a temperature of about 20°F just prior to the forming step.

The sub-divided portions of "tempered" fish are then fed individually to a forming station and are there pressed into a predetermined shape. The shape of the forming die will, of course, depend upon the final shape desired for the fish portion, and the pressure required to effect proper formation will depend upon the size of the portion and the temperature at which it is formed. For example, in order to effect formation of a portion of cod flesh weighing approximately 3½ ounces and "tempered" to about 20°F roughly 600 lbs. pressure must be applied for each piece of fish.

After the portions have been formed to the required shape they are carried away from the forming station and are either refrigerated or are prepared for subsequent processing. Since the portions of the fish are still in a substantially frozen condition after the forming step they retain the shape imparted to them by the forming die.

The process and the product produced thereby will now be described more fully with reference being had to the drawings.

Figure 1:
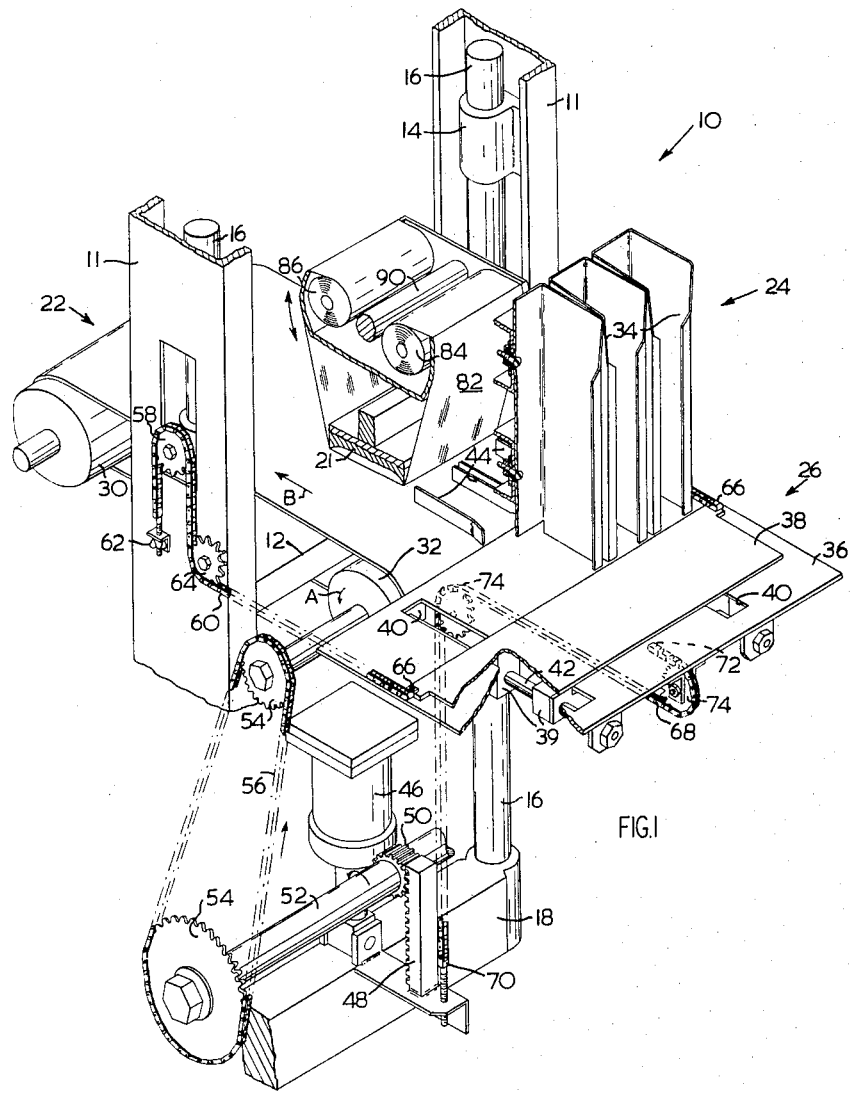
FIG. 1 is a perspective view of a press arrangement for forming frozen portions of meat with parts of the press being cut away to show the internal structure.

The apparatus shown in FIG. 1 is designated generally by reference numeral 10 and includes a suitable framework, only a portion of which is shown in FIG. 1, thereby to support the several components of the apparatus in the required relationship. The machine frame includes two upright support members 11. A fixed horizontal platten 12 extends therebetween and is rigidly connected thereto. Frame support members 11 include suitable guides 14 which serve to slidably support a pair of forming die actuator rods 16. Each actuator rod 16 is associated with a respective one of the frame members 11. Rods 16 extend vertically upwardly in spaced relation from a lower cross beam member 18 to which thay are both rigidly connected.

Disposed above fixed platten 12 and rigidly interconnected to and extending between actuator rods 16 is a die head assembly 20. Die head assembly 20 includes a plurality of individual forming dies 21 disposed in side-by-side relationship across the width of the machine, each die 21 having its lower surface hollowed out so as to form a cavity of the desired size and shape. Those skilled in the art will realize that the die head assembly may be of unitary structure, i.e., it may comprise a multi-cavity die.

It will be apparent from the above that as actuator rods 16 are shifted upwardly and downwardly, the die head assembly 20 is moved upwardly and downwardly in a vertical plane extending through the longitudinal axis of fixed platten 12.

In order to feed individual portions of fish to a position intermediate fixed platten 12 and forming die assembly 20, a feed assembly is provided which includes a belt conveyor assembly 22, a magazine storage assembly 24 and a feed table and feed plate assembly 26. Turning first to the belt conveyor assembly 22, it will be seen that there is provided an endless, generally horizontally disposed conveyor belt 28, the upper run of which passes directly over and in contact with the upper planar surface of fixed platten 12. Conveyor belt 28 extends about a pair of spaced parallel rollers 30 and 32 which are disposed on opposing sides of the fixed platten 12. Roll 30 is an idler roll while roll 32 is connected to suitable driving means which wil be referred to hereinafter.

Magazine storage assembly 24 includes a series of magazines 34 disposed at the entrance to the conveyor belt immediately over and in spaced relation to a generally horizontally disposed feed table 36. The number of magazines 34 provided is equal to the number of individual forming dies 21 provided on the die head assembly 20. Mounted for reciprocation on feed table 36 is a feed plate 38. Feed plate 38 is secured to blocks 39 which extend downwardly through a pair of longitudinally extending parallel slots 40 provided in table 36 with blocks 39 being slidably mounted upon a pair of correspondingly spaced parallel guide rods 42. When feed plate 38 is in its rearmost position, the lowermost precut food portion in each of the magazines 34 drops downwardly onto the surface of feed table 36. Then, as feed plate 38 is advanced forwardly, the individual portions of fish are advanced forwardly onto the entrance end portion of the belt conveyor 22 and into positions intermediate spaced guide fingers 44 which are located at the entrance end of belt conveyor system 22. Guide fingers 44 serve to properly align and position the pieces of food just before they are moved to the required position by belt conveyor 22 between the forming dies 21 and the fixed platten 12.

In order to effect actuation of all of the above components, a hydraulic ram 46 is provided which is suitably rigidly connected to the machine frame. This hydraulic ram 46 is of the double acting variety and is connected via suitable valving means to a hydraulic pump and motor (not shown). When the apparatus 10 is in operation, the hydraulic ram effects up and down reciprocation of the lower cross beam member 18 with the result being that actuator rods 16 together with the die head assembly 20 connected therebetween are all reciprocated upwardly and downwardly in a vertical plane thereby to effect formation of the individual portions of fish as they are fed to their respective positions between the forming dies 21 and the fixed platten 12 by virtue of the actuation of the previously described belt conveyor assembly 22 and the feed table and feed plate assembly 26. In order that the conveyor belt 28 and the feed plate 38 may be driven in timed relation to the up and down movement of die head assembly 20, a toothed rack 48 is connected to lower cross beam 18. Rach 48 makes contact with a pinion 50 which is connected via a one way clutch to shaft 52. Shaft 52 is connected via sprockets 54 and roller link chain 56 to the drive roll 32 of the belt conveyor assembly. The one way clutch is so arranged that upon upward movement of cross beam 18 and die head assembly, 20, drive roll 32 is rotated in the direction shown by arrow A with conveyor belt 28 being also shifted in the direction shown by arrow B. At the same time, the feed plate 38 is drawn towards the entrance end of the conveyor assembly due to the action of small sprockets 58 connected to opposing ends of die head assembly 20 which serve to increase the lengths of the roller link chains 60 contained in the bights of the chain which are drawn upwardly by sprockets 58 between points of connection 62 of chains 60 to the machine frame and further small sprockets 64 rotatably mounted on the machine frame as well. The opposing ends of chains 60 are connected to opposing ends 66 of feed plate 38; hence, as the die head assembly 20 is shifted upwardly, sprockets 58 are also moved upwardly thus increasing the length of the bights of chain contained between fixed ends 62 and sprockets 64 with the result being that the roller link chains 60 draw the feed plate 38 towards the entrance end of the conveyor assembly 22. In order to reverse the order of feed plate 38 when the die head assembly is lowered, a further roller link chain 68 is provided with its one end secured to the cross beam assembly 18 at connection point 70 and its opposite end attached at 72 to the trailing edge of feed plate 38. Suitable guide sprockets 74 guide the roller link chain between the two points mentioned above in such a manner that when the cross beam 18 is lowered, the feed plate 38 is caused to move rearwardly.

It can be seen from the above description that as the hydraulic ram 46 effects lifting of the lower cross beam 18, the die head assembly 20 is raised upwardly. At the same time, the conveyor belt 28 is driven forwardly by one step in the direction shown by arrow B. The movement of conveyor belt 28 is sufficient to bring a series of rectangular pieces of fish from their respective positions intermediate the several pairs of guide fingers 44 to positions below respectively associated ones of the forming dies 21. Movement of the feed plate 38 forwardly simultaneously with the forward movement of the conveyor belt 28 due to the action of the previously described sprocket chain assemblies including roller link chain 60 takes place thereby to move a further series of fish pieces onto the entrance portion of the conveyor belt 28 in readiness for the next cycle of operation. When the hydraulic ram reverses its movement, the lower cross beam 18 is shifted downwardly together with the actuator rods 16 and die head assembly 20. At the same time feed plate 38 is shifted rearwardly as a result of the action of roller link chain 68. As the die head assembly moves downwardly, its forming dies 21 come into pressurized contact with respectively associated ones of the portions of fish that have been fed thereunder by the above described feed mechanism. This action is shown in FIGS. 2 and 3. It will be seen in FIG. 2 that the forming die (shown together with the feed assembly and platten as being in cross section) is positioned just above the rectangular portion of fish 80. From FIG. 3, it will be seen that the forming die 21 has been shifted downwardly so that it has come into pressurized engagement with the fish portion 80 thus effecting deformation of same, whereby the portion of fish conforms in shape to the shape of the die cavity. The lowermost surface of the portion of fish, of course, conforms to the flat surface of platten 12.

FIG. 4 illustrates an arrangement in accordance with the invention for effecting rapid ejection of the formed product from the forming dies 21. A web of flexible sheet material 82 is disposed across the mouth of the cavity of each forming die 21. During the forming step, this web of flexible material is deformed upwardly and inwardly and it is thus interposed between the fish product and the interior of the die. In order to withstand the stresses involved during this operation the web of material 82 must be quite tough and resilient. Sheet polyethylene or "Mylar" film have been found to be quite satisfactory. The web of material 82 extends between supply and take-up rolls 84 and 86 respectively, the latter being mounted in a drum-like carrier 88 in spaced parallel relation. Carrier 88 is mounted for rocking motion by means of axle 90 which extends therethrough parallel to rolls 84, 86, the ends of axle 90 being rotatably mounted in supports 92 firmly secured to the upper side of forming die assembly 20. The sidewalls 94 of carrier 88 are curved such that in end elevation they appear as circular arcs centered at axle 90. The web 82 passes from supply roll 84 first down over one sidewall 94, then over the forming die cavities, and thence upwardly over the other sidewall 94 and onto the take up roll 86. Thus, as carrier 88 rocks about its axis, the lengths of web alternately wrap on and off from the opposing sidewalls 94 in a relatively smooth fashion with the web at the same time moving back and forth across the mold cavities. In order to cause rocking motion of carrier 88, the axle 90 is rigidly connected to a crank arm 96, the outer end of which is connected to link 98. Link 98 is connected at its lower end to a fixed pivot point 99 and at its upper end is provided with a slot 100 disposed longitudinally of the link and which receives a pin 102, the latter being secured to the above mentioned crank arm 96. A tension spring 104 urges pin 102 to the bottom end of the slot.

Figure 7:
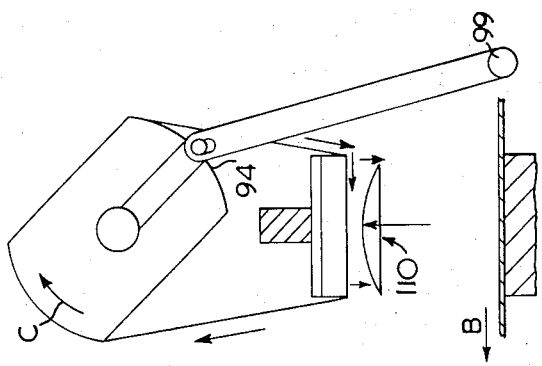
FIGS. 5–7 are diagrammatic views illustrating the operation of the ejecting means of the present invention.
Figure 6:
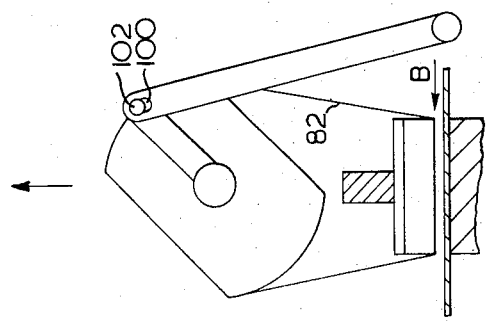
Figure 5:
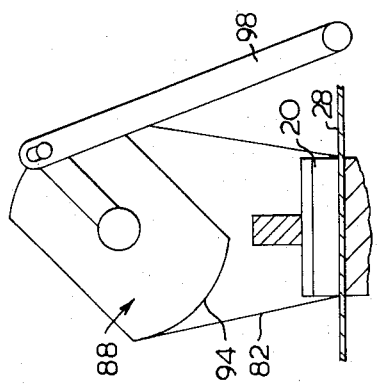

The operation of the ejection system will be understood from a review of FIGS. 5–7. In FIG. 5 the die assembly 20 is in its lowermost position and carrier 88 occupies its extreme counter clockwise position. In FIG. 6 the die assembly 20 has lifted slightly away from platten 12 and in so doing pin 102 moves to the top of slot 100. As yet no motion of the carrier or the web has taken place as a result of the "lost-motion" connection between the link 98 and carrier 88. This is important; if the carrier were forced to rotate while the web was still forcibly clamped between the food product and the die, the web might be torn. Hence, the "lost-motion" connection permits the die assembly to be lifted slightly to permit pressure release before web movement is forced to take place. As seen in FIG. 7 the die assembly has moved upwardly still further. The relative motion between pivot point 99 and the die assembly 20 causes clockwise rotation of carrier 88 as shown by arrow C. Since the supply and take up rolls 84, 86 are locked against rotation, the fixed length of web extending therebetween is forced to change its position with the result being that the web moves across the face of the die cavity a substantial distance (preferably a distance about equal to the length of the forming die measured in the direction of web movement relative to the die). It has been found that this type of relative movement of the web across the mouth of the forming die is extremely effective in causing ejection of the formed foodstuff from the forming die cavities. It will also be noted that the conveyor belt 28 is moving forwardly in the direction of arrow B during the ejection process; hence the formed food portions fall on the moving conveyor belt and are carried away by same clear of the forming die and of the next group of flesh portions being fed into position below the die.

The supply and take up rolls are held in a locked position by any suitable locking means (not shown). Periodically, these rolls are manually rotated so as to shift worn and weakened sections of the web forwardly to thereby expose new fresh web material to pressure and wear.

It should be noted here that a lubricant, such as clear vegetable oil, should be maintained between the die and the web to allow free slippage between them and to reduce wear on the web. The surface of the die cavity is preferably of hard chromium due to the fact that this material does not cause the lubricating oil to become blackened or stained as might be the case if other materials, steel, etc. were used. Stained oil is objectionable as some of the lubricating oil tends to find its way onto the fish; if the oil is colorless no problem is created. However darkened oil discolours the food portions and may render them unsalable.

A formed portion of fish as produced by the method and apparatus described above is shown in FIGS. 8 and 9. FIG. 8 is a plan view while FIG. 9 shows the fish portion in elevation. From FIG. 8 it will be seen that the fish portion 110 has a smoothly contoured marginal outline 112 (i.e., fillet-shaped). It will also be seen from FIGS. 8 and 9 that the upper major surface 114 of the formed portion is curved while the lower surface 116 is flat (due to the action of the flat platten 12). The central portion of the upper major surface 114 has a shallow convex curvature with the surface 114 becoming much more sharply curved along the regions just inwardly of the marginal edge 112 of the formed product with such sharply curved surface directed toward the relatively flat bottom surface 116 of the product with the top and bottom surfaces intersecting all along the outermost marginal edge 112 of the product.

In order to produce the product described above, the dimensions of the subdivided portions of fish should be selected in accordance with the size and dimensions of the forming die cavities. The volume of each fish portion should correspond as closely as possible to the volume of each die cavity so that there will be no excess or "flash" produced during the forming step and the portions must be positioned accurately beneath the forming dies just before each forming step. Also the longitudinal axis of the cut portion of fish should be approximately in alignment with the longitudinal or major axis of its associated forming die cavity.

After completion of the forming operation, the formed portions of fish may be placed back in refrigerated storage in a continuous freezer, or alternatively they may be taken directly to a packaging line.

Although the present invention has been described in its preferred form with a certain degree of particularity it is understood that the present disclosure of the preferred form has been made only by way of example and that numerous changes in the details of construction and mode of operation may be resorted to without departing from the spirit and the scope of the invention as hereinafter claimed.

I claim:

1. In apparatus for producing a shaped food product including a forming station arranged to engage and form portions of the food fed thereto and including a forming die having a die cavity of the desired shape therein and means for effecting relative movement between the forming die and an other die member between a retracted position and a food engaging and forming position; means for feeding individual portions of the food to said forming station, said feeding means being adapted to feed each food portion to a position intermediate the forming die and said other die member when the forming die is in a retracted position relative to the other die member such that when said forming die is moved relative to the other die member into the engaging and forming position said food portion is engaged in pressurized relation between the forming die and the other die member and enters into said die cavity and assumes the shape of same, means for actuating said feeding means and effecting said relative movement between the forming die and the other die member in timed relation to effect sequential forming of said food portions, and ejecting means associated with said forming die for positively ejecting the formed food therefrom, the improvement wherein said ejecting means includes a carrier for supporting a web of flexible material across the mouth of the die cavity such that the web becomes sandwiched between the die cavity and the food product during the forming step, pivot means mounting said carrier for rocking motion about an axis relative to the forming die with said rocking motion effecting movement of the web across the mouth of the die cavity, and means operative to rock said carrier and move the web across the die cavity sufficiently as to effect ejection at the end of each forming step after the forming die has moved relative to the other die member an amount sufficient as to separate them and release the web from pressurized engagement between the wall of the die cavity and the formed food portion.

2. Apparatus according to claim 1 further including a web supply roll and a web take up roll mounted to said carrier and arranged such that a length of web extending therebetween passes over the die cavity.

3. Apparatus according to claim 1 wherein said means operative to rock said carrier includes linkage means connected to said carrier at a point spaced from its rocking axis to transmit movement to said carrier in response to the relative movement between said forming die and said other die member to cause the carrier to rock and effect said movement of the web across the mouth of the die cavity.

4. Apparatus according to claim 1 wherein said carrier has curved side walls over which said web passes and upon which said web wraps and unwraps during rocking motion of the carrier.

5. Apparatus according to claim 3 wherein said linkage means includes a lost motion connection to effect said rocking motion only after said forming die has separated from the other die member sufficient as to release the web from pressurized engagement between the die and the food portion.

6. Apparatus according to claim 1 wherein said forming die includes a plurality of said die cavities, said carrier being adapted to support a web which is sufficiently wide as to extend over the mouths of all of said cavities.

* * * * *